Oct. 5, 1926.

G. C. OXER ET AL 1,601,834

ELECTRIC DISCONNECTER

Filed Nov. 6, 1922      2 Sheets-Sheet 1

WITNESSES

INVENTORS

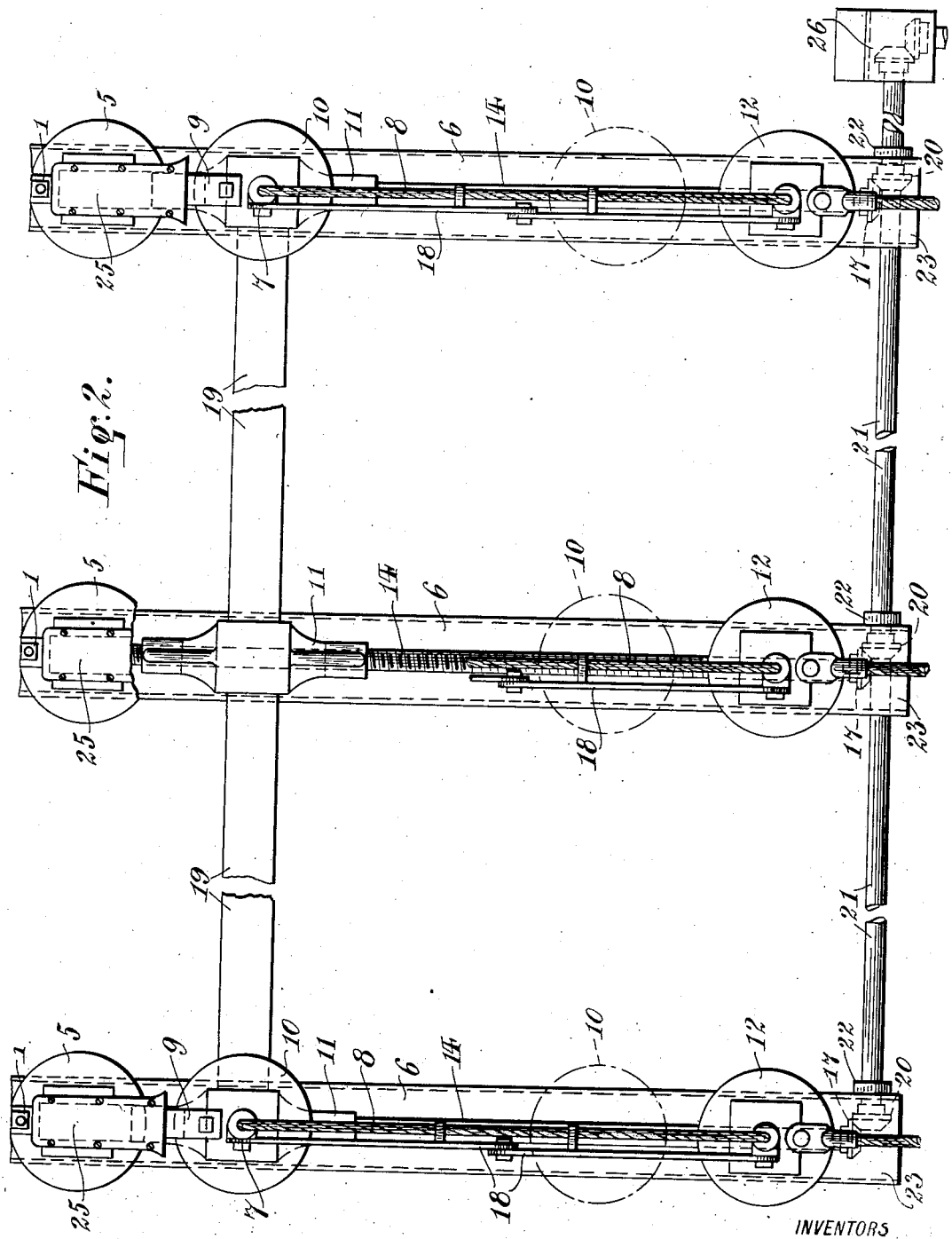

Patented Oct. 5, 1926.

1,601,834

UNITED STATES PATENT OFFICE.

GEORGE C. OXER AND MAURICE M. SAMUELS, OF NEW YORK, N. Y.

ELECTRIC DISCONNECTER.

Application filed November 6, 1922. Serial No. 599,437.

Our invention relates to an improved form of disconnecter, principally to be used, in connection with oil circuit breakers which are employed on high tension circuits, for the purpose of disconnecting the oil circuit breakers from the energized conductors, when it becomes necessary to inspect or repair the oil circuit breaker; or to connect said oil circuit breaker to the conductors of the same or another circuit; or to cause an opening to be made in an electric conductor by drawing apart a movable contact, carrying one member away from the other fixed member to a safe electrical distance, or to close an opening in an electrical conductor by bringing one terminal of the conductor up to the other fixed terminal and joining by suitable contact pieces.

Our new form of disconnecter is particularly adaptable to the operation of any number of single pole elements, in a single group, as per example: Three single pole elements operated simultaneously by one suitable operating mechanism would constitute a complete disconnecter for a three phase circuit, such operating mechanism being either manually or electrically actuated. This disconnecter has special advantages when used on electric circuits of high potential, either unexposed or exposed to the weather, more particularly the latter.

The most primitive form of disconnecter for this purpose consisted of a bar of metal called a blade, hinged at one end to a conductor terminal, the whole supported on an insulator, and making suitable contact at the other end, with the conductor terminal, which is also mounted on an insulator. In order to operate manually such a disconnecter with safety a suitable portable rod of insulating material was used to draw the metal blade forward or backward. For very high voltages, safety of life necessitated great distance between the disconnecter and the person operating same; thus the insulating rod becomes very long and unwieldy in the hands of the operator, requiring considerable time and risk to engage said rod with the disconnecter blade. Furthermore, in severe weather conditions, such as rain, snow, or sleet, this method becomes dangerous to the safety of both the operator and the property.

In the case of a single phase electric circuit two of such disconnecters were installed, and in the case of a three-phase circuit three were installed.

The next step in development was to attempt to move two or more of these single elements simultaneously by a single operation. Such a disconnecter is known, and consists of two or more metal blades, which form a part of the electrical circuit, each attached to the conductor on a suitable insulator by means of a hinge and making connection with the conductor at the opposite end by means of a suitable contact supported on a suitable insulator. The metal blades are in turn connected, by means of suitable insulators, with a common actuating mechanism, which in turn is actuated at a distance either manually or electrically.

This form of disconnecter has the disadvantages that the insulators in the moving mechanism are subject to lateral strains, and the contacts cannot be completely protected from snow and ice. Further, the great length of blade necessary at high voltages requires excessive clearance distances when mounting the disconnecter for use.

Another form of disconnecter known consists of metal arm, forming part of the electrical circuit and supported rigidly at the center on an insulator, which insulator is so mounted on a fixed base that it may be rotated through an angle of 90°. The ends of the conductor to be connected or disconnected are mounted, together with suitable contacts, each on an insulator fixed to a base which is common to all three insulators. Thus by rotating the movable insulator the metal arm is caused to engage with or disengage from the conductor terminals at each end located on the fixed insulators. Two or more of these single pole elements may be operated in unison by a single actuating mechanism, which in turn is actuated at a distance, either manually or electrically. This form of disconnecter has the disadvantages that the electrical conductor is open at two points simultaneously instead of one, which increases the probability of trouble at contacts by 100%, and that said two contacts cannot be entirely protected from snow and ice, in that they must necessarily stand at right angles to the plane of the disconnecter, and in the plane of the rotating blade. Furthermore, in operating the disconnecter by rotating the moving insulator the porcelain of said insulator is subjected to torsional stresses which often cause its failure, or the insulator becomes loosened from the metal support upon which it is mounted.

Another form of disconnecter known consists of a double metal blade, which is a part of the electrical circuit, both members of which are mounted rigidly on a suitable insulator, which insulator is caused to move in the direction of the axis of the conductor. The two terminals of the conductor, together with suitable contact devices, are mounted on insulators which are fixed upon the supporting structure and in the same plane as the moving insulator. The contact pieces attached to the double blade are mounted between the single elements of the blade in the same plane, and parallel to the axis of the blade. By causing the blade to move forward or backward the contact pieces of the blade engage the fixed contacts, thus connecting or disconnecting the conductor as the case may be. By combining two or more of the said movable insulators with their blades on a common base, and in turn moving said common base by a suitable mechanism a disconnecter for several conductors may be operated by a single actuating mechanism, either manually or electrically. The disadvantages of this form of disconnecter are that the conductor is open or closed, as the case may be, at two points instead of one, which increases the probability of trouble at the contacts by 100%; that the blade is necessarily mounted on the movable insulator in such a position that the major portion of said blade constitutes a cantilever beam, which becomes long for high voltages, and is very unsteady due to vibration, thus necessitating a large centering medium at the extreme contact point; that in disconnecters for two or more high voltage conductors the mounting of all of the moving insulators and blades on a common base, which base is moved by a suitable mechanism, constitutes an unnecessarily heavy and cumbersome structure which is difficult to align, will collect large masses of snow and ice, and requires much power to operate.

Other disconnecters are known but the forms which we have described are the most widely known and the enumerated disadvantages are in general similar in all. These disadvantages we have overcome in our invention. Our disconnecter opens the conductor at one point only, one terminal of the conductor remaining in a fixed position while the other terminal of the conductor is translated in the direction parallel to the axis of the conductor, to a safe distance from the fixed terminal, thus effectively disconnecting the circuit. Our invention will be best understood by referring to the accompanying drawing, which shows a preferred embodiment thereof, in which—

Figure 2 shows a front elevation of the disconnecter, together with the operating mechanism, as employed in connection with three conductors, known as a three phase circuit.

Similar numerals refer to similar parts throughout.

Figure 1:
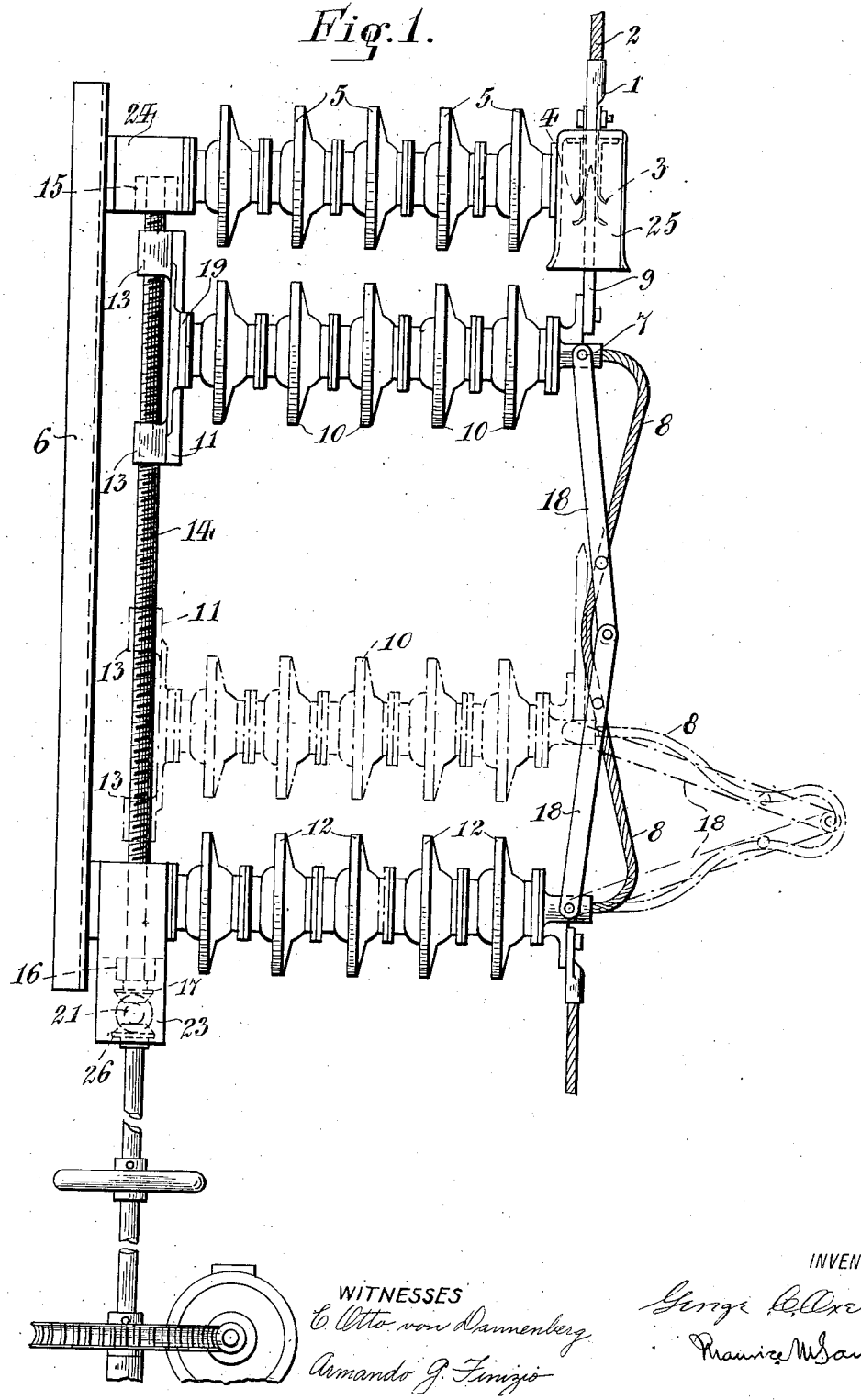
Figure 1 is a side elevation of the disconnecter. In this figure the disconnecter is shown in the closed position, the dotted lines indicating the open position, that is, the position in which the conductor is disconnected.

As shown in the drawing, one terminal 1 of the conductor 2 together with the stationary contact pieces 3 and 4 are mounted on an insulator 5 which in turn is mounted rigidly at one end of disconnecter base 6.

The other terminal 7 of the conductor 8 together with contact member 9 are mounted on a second insulator 10 which insulator is in turn mounted on an independent and movable base 11.

A third insulator 12 is mounted rigidly at the other end of disconnecter base 6 and supports conductor 8 which is securely attached thereto.

The movable insulator 10 together with its base 11 is made to move backward or forward between the fixed insulators 5 and 12, in line with the axis of the conductors 2 and 8 and in the plane of the axes of the fixed insulators 5 and 12 by a suitable mechanism, thus connecting or disconnecting the circuit, as the case may be, by causing moving contact piece 9 to engage or disengage with fixed contact members 3 and 4.

The movable insulator 10 and its base 11 are supported, as well as translated, by the threaded nuts 13 which engage with the screw 14; base 11 being rigidly attached to threaded nuts 13. Screw 14 is so designed that when rotated, the pressure developed between itself and threaded nuts 13 will crush and shear away ice that may accumulate thereon. Support is obtained for screw 14 by means of bearing 15 attached to one end of disconnecter base 6, and bearing 16 attached to the other end of disconnecter base 6. Motion is transmitted to screw 14, by means of a suitable mechanism actuated either manually or electrically.

In order that the insulator 10, designated as movable, may move freely, that part of the conductor 8, between the fixed insulator 12 and movable insulator 10, is made of flexible cable.

In order to take up the slack in said portion of flexible conductor 8, incident to the moving backward of the movable insulator 10, a jointed link 18 is inserted between and attached to the fixed insulator 12 and the movable insulator 10. This joined link 18 is actuated by the movable insulator 10, and carries thereon the flexible conductor 8; it moves only in the plane of the axes of the insulators 10 and 12, having no lateral motion, and in a direction away from the base 6 in opening, and towards the base of the disconnecter in closing, thus keeping the flexible conductor 8 taut and in the plane of the axes of the insulators 5, 10 and 12, at all times.

A complete disconnecter for two or more conductors can be constructed and operated in unison by mounting two or more of the above described elements, each one parallel to the other and connecting the movable insulator bases 11 together by means of a suitable rigid distance piece 19. The several elements are then actuated individually from a common mechanism, consisting of gears 20 mounted rigidly on shaft 21; gears 20 meshing with and transmitting power to gears 17. The shaft 21 is securely mounted by means of bearings 22, to the disconnecter bases, 6. Power for operating the complete disconnecter, is transmitted to shaft 21, by means of a suitable mechanism 26, and may be either manual or electric.

In order that the operating mechanism may be completely protected from snow and ice, and suitable lubrication assured, the gears 17 and 20, together with bearings 16 and 22, are totally enclosed by a metal housing 23, which is rigidly attached to and becomes a part of disconnecter base 6. Likewise bearing 15 is totally enclosed in a metal housing 24, which is rigidly attached to and becomes a part of disconnecter base 6.

In order that the contact members 3 and 4 may be protected from snow and ice, a protective covering 25, of metal or suitable material, is provided. This protective covering 25 consists of a box of rectangular or elliptic section open only at one end, through which the contact member 9 enters, and containing therein, the said contact members 3 and 4, or other suitable form of contact member. The protective covering 25 may be an integral part of the members attached to insulator 5, and have a removable cover plate for access to the interior, or it may be a separate member, detachable, and entirely removable, for access to the contact members 3 and 4, or other suitable form.

The specific type of fixed contact members 3 and 4, and movable contact member 9, are shown thus only for purposes of illustrating our invention, as numerous forms of known contact devices may be used, within the protective covering 25, with the same result.

This new type of disconnecter is of particular advantage when mounted with the base 6 in a vertical position, thus excluding snow or ice, at the top and all four sides, from the fixed contact, a feature which other forms of disconnecter do not possess. The mounting is not restricted to this position, as it can be employed to advantage in any other position, either indoors or outdoors.

The advantages of our disconnecter are, that the conductor is opened at one point only, by single contact members; that when mounted in a vertical position the upper contact member is completely protected from rain, snow and ice; that the moving insulator is translated bodily with a uniform motion, and not subjected to appreciable shock, torsional or cantilever stresses; that the connecting or disconnecting of the circuit is positive, when the mechanism is actuated; that the transmitting links of the common actuating mechanism are completely housed, excluding rain, snow or ice, thus insuring positive operation under severest weather conditions and assuring lubrication at all times; that the exposed parts of the actuating mechanism are so designed that snow or ice will be removed by such parts when actuated.

It is evident that our invention may be embodied in many other forms than that shown and described, and we therefore do not wish to be restricted by the particular forms herein shown, but intend to cover by the claims, all changes and modifications which are within the spirit and scope of our invention.

What we claim as new, and desire to secure by Letters Patent, of the United States of America, is:

1. In a device of the character described, a stationary contact, a stationary conductor terminal, means for insulatingly supporting said contact and terminal, a contact mounted for movement in a straight line toward and away from said stationary contact, means for insulatingly supporting said movable contact, a flexible conductor connecting said movable contact with said terminal, means for moving said movable contact into and out of co-operating relation with said stationary contact by a straight line movement, and a pair of links connecting the insulating supporting means for said terminal and movable contact, said links having means for supporting said conductor so that the same lies on one side of said links near the ends thereof and on the opposite side of said links near said pivot to hold said flexible conductor substantially taut for any position of said movable contact.

2. A single break switch comprising a pair of fixed insulating supporting members, a stationary contact on one of said members, a conductor terminal on the other of said members, a movable insulator mounted to move in a straight line path between said members a member having screw-threaded engagement therewith for moving said movable insulator, a contact member mounted thereon movable into and out of co-operating relation with said stationary contact, a flexible conductor connecting said terminal and movable contact and a pair of links for supporting said conductor connecting the conductor terminal insulating member and said movable insulating member to align the movable contact with the stationary contact.

Signed at New York, in the county of New York and State of New York, this 31st day of October, A. D. 1922.

GEORGE C. OXER.
MAURICE M. SAMUELS.